United States Patent
Basso et al.

(10) Patent No.: US 11,661,874 B2
(45) Date of Patent: May 30, 2023

(54) HEATING DEVICE FOR AN EXHAUST GAS PURIFICATION DEVICE HAVING A REDUCED FOOTPRINT

(71) Applicant: FAURECIA SYSTEMES D'ECHAPPEMENT, Nanterre (FR)

(72) Inventors: Christophe Basso, Chatenois les Forges (FR); Yannick Fourcaudot, Luze (FR)

(73) Assignee: FAURECIA SYSTEMES D'ECHAPPEMENT

( * ) Notice: Subject to any disclaimer, the term of this patent is extended or adjusted under 35 U.S.C. 154(b) by 0 days.

(21) Appl. No.: 17/504,638

(22) Filed: Oct. 19, 2021

(65) Prior Publication Data

US 2022/0127986 A1  Apr. 28, 2022

(30) Foreign Application Priority Data

Oct. 27, 2020  (FR) .................................. 20 10993

(51) Int. Cl.
- *F01N 3/08* (2006.01)
- *F01N 9/00* (2006.01)

(52) U.S. Cl.
CPC ............ *F01N 3/0892* (2013.01); *F01N 9/00* (2013.01); *F01N 2240/04* (2013.01); *F01N 2240/16* (2013.01); *F01N 2390/02* (2013.01)

(58) Field of Classification Search
CPC .... F01N 3/0892; F01N 3/2013; F01N 3/0222; F01N 3/2026; F01N 9/00; F01N 2240/04; F01N 2240/16; F01N 2390/02; Y02T 10/12
See application file for complete search history.

(56) References Cited

U.S. PATENT DOCUMENTS

| | | | | |
|---|---|---|---|---|
| 5,245,825 | A | * | 9/1993 | Ohhashi .................. H05B 3/12 422/174 |
| 5,672,324 | A | | 9/1997 | Okamoto et al. |
| 5,749,223 | A | | 5/1998 | Kreucher et al. |
| 6,025,578 | A | * | 2/2000 | Bruck .................. F01N 3/2026 422/177 |
| 7,055,314 | B2 | * | 6/2006 | Treiber ................ F01N 3/0231 60/297 |
| 11,319,850 | B2 | * | 5/2022 | Korenaga ............... F01N 11/00 |

FOREIGN PATENT DOCUMENTS

| DE | 102013217009 A1 | 3/2014 |
|---|---|---|
| DE | 102014115923 A1 | 5/2016 |

OTHER PUBLICATIONS

Preliminary Search Report for French Application No. 2010993 dated Apr. 30, 2021.

* cited by examiner

*Primary Examiner* — Audrey B. Walter
*Assistant Examiner* — Dapinder Singh
(74) *Attorney, Agent, or Firm* — Carlson, Gaskey & Olds, P.C.

(57) ABSTRACT

A heating device comprises a heating element, permeable to the exhaust gas, and intended to be traversed by the exhaust gas flowing in a longitudinal direction. The heating element comprises two electrical poles, and two electrodes, each electrode being solidly attached to a respective electrical pole. Each electrode has a generally elongated shape along a respective elongation direction. At least one of the electrodes has a direction of elongation substantially parallel to the longitudinal direction.

15 Claims, 5 Drawing Sheets

HEATING DEVICE FOR AN EXHAUST GAS PURIFICATION DEVICE HAVING A REDUCED FOOTPRINT

CROSS-REFERENCE TO RELATED APPLICATIONS

This application is a U.S. non-provisional application claiming the benefit of French Application No. 20 10993, filed on Oct. 27, 2020, which is incorporated herein by reference in its entirety.

TECHNICAL FIELD

The present disclosure relates to a heating device for an exhaust gas purification device, particularly for a combustion engine. Such a purification device is intended to be arranged in the exhaust line of the combustion engine.

For example, the combustion engine is fitted to a vehicle, in particular a motor vehicle, a public transport or freight vehicle, a marine vehicle, or any other conceivable vehicle. The combustion engine can also be used in a stationary facility.

BACKGROUND

Exhaust lines of vehicles equipped with internal combustion engines usually include catalytic purification devices, for example to convert NOx, CO and hydrocarbons into $N_2$, $CO_2$ and $H_2O$. Such devices are usually only effective when the catalytic material is at a temperature above a predefined threshold temperature.

For this purpose, purification devices have been developed comprising a heating element mounted opposite the upstream side of a purification element, so as to accelerate the heating of the purification element when the vehicle is started.

Thus, an exhaust gas purification device, in particular for a combustion engine, is already known in the state of the art, and includes a housing extending in a longitudinal direction, and a purification device housed in the housing.

The purification device is associated with a heating device that includes a heating member, arranged in the housing, permeable to the exhaust gas and intended to be traversed by the exhaust gas flowing in the longitudinal direction. The heating member comprises two electrical poles and two electrodes, each electrode attached to a respective electrical pole, and each electrode having a generally elongated shape along a respective electrode axis.

One purpose of the disclosure is to reduce the footprint of such a purification device, for better integration of this purification device into its environment.

SUMMARY

The subject disclosure provides a device for heating exhaust gases, in particular for a combustion engine, comprising:
  a heating element, permeable to the exhaust gases and intended to be traversed by the exhaust gas flowing in a longitudinal direction, the heating element comprising two electrical poles,
  two electrodes, each of the two electrodes attached to a respective one of the two electrical poles, each electrode having a generally elongated shape along a respective elongation direction,
  and wherein at least one of the electrodes has a direction of elongation substantially parallel to the longitudinal direction.

The longitudinal arrangement of the at least one electrode allows the radial footprint of the heating device to be reduced.

A heating device according to the disclosure may further comprise one or more of the following features, taken alone or in any technically feasible combinations.
  The two electrodes have a direction of elongation substantially parallel to the longitudinal direction.
  The two electrodes are arranged on the periphery of the heating element.
  The heating element is a metal foam or a metal grid.
  The heating element has a general shape delimited by two first walls parallel to each other on the one hand, two second walls parallel to each other on the other hand, and two curved walls each extending between a respective one of the first walls and a respective one of the second walls.

The disclosure also relates to a combustion engine exhaust line that comprises:
  a heating device as defined above, and
  an inlet member for connecting the heater to an upstream portion of the exhaust line.

An exhaust line according to the disclosure may further comprise one or more of the following features, taken alone or in any technically feasible combinations.
  The exhaust line comprises a holding element, connected to the inlet element on the one hand and connected to a housing extending in the longitudinal direction on the other hand, the heating element being housed between the inlet element and the holding element.
  The input element and/or the holding element has at least one opening for the passage of at least one of the terminals having a direction of elongation substantially parallel to the longitudinal direction.
  For at least one electrode having a direction of elongation substantially parallel to the longitudinal direction, the exhaust line comprises a respective protective element for this electrode, the protective element being elongated substantially parallel to the corresponding electrode, and preferably at least partially surrounding the corresponding electrode.

The disclosure finally relates to a vehicle comprising a combustion engine and comprising an exhaust line as defined above.

BRIEF DESCRIPTION OF THE DRAWINGS

Various aspects and advantages of the disclosure will be highlighted in the following description, given only as a non-limiting example and made with reference to the appended figures, among which.

DETAILED DESCRIPTION

Figure 1:
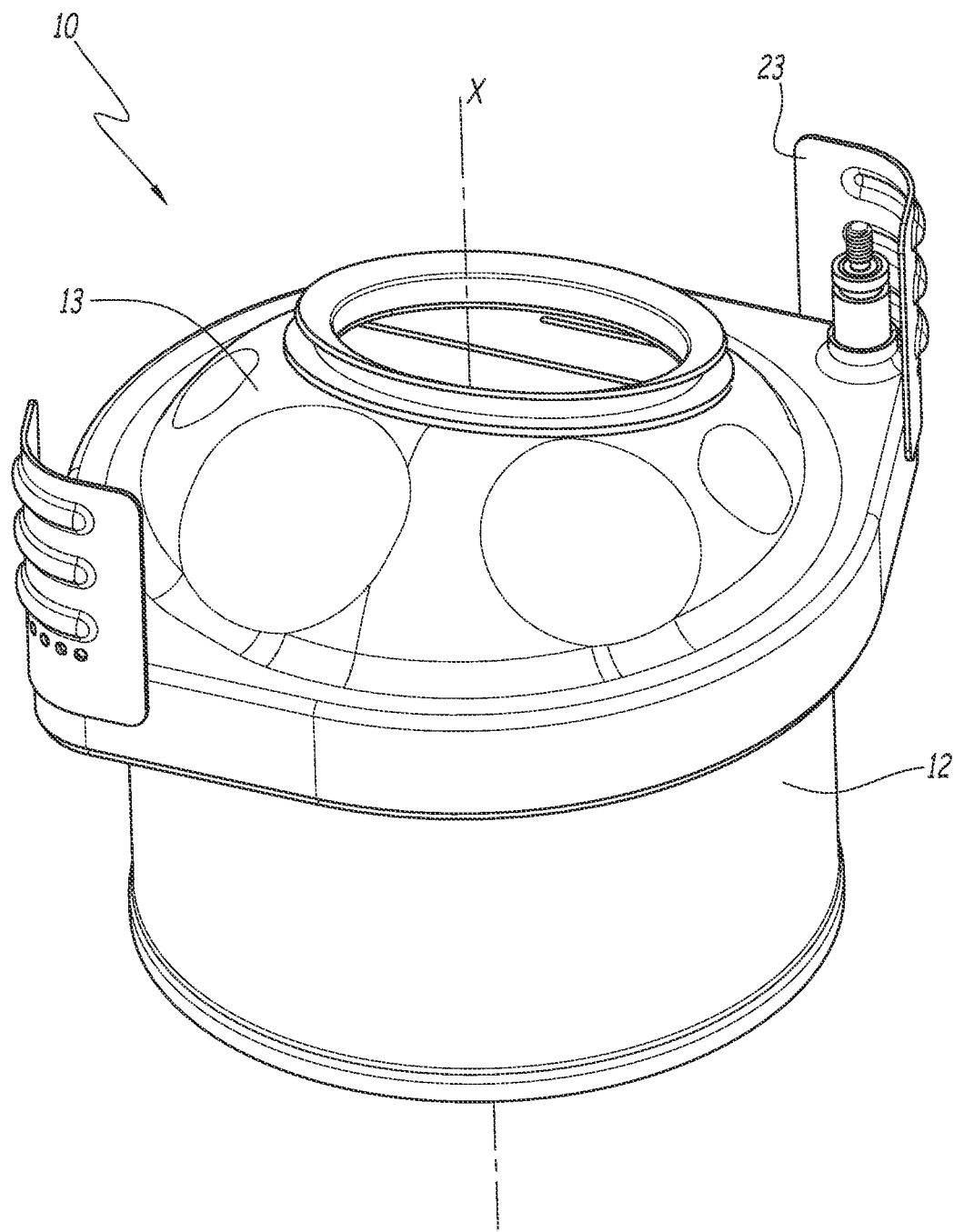
FIG. 1 is a perspective view of a purification device comprising a heating device according to a first example embodiment of the disclosure.
Figure 2:
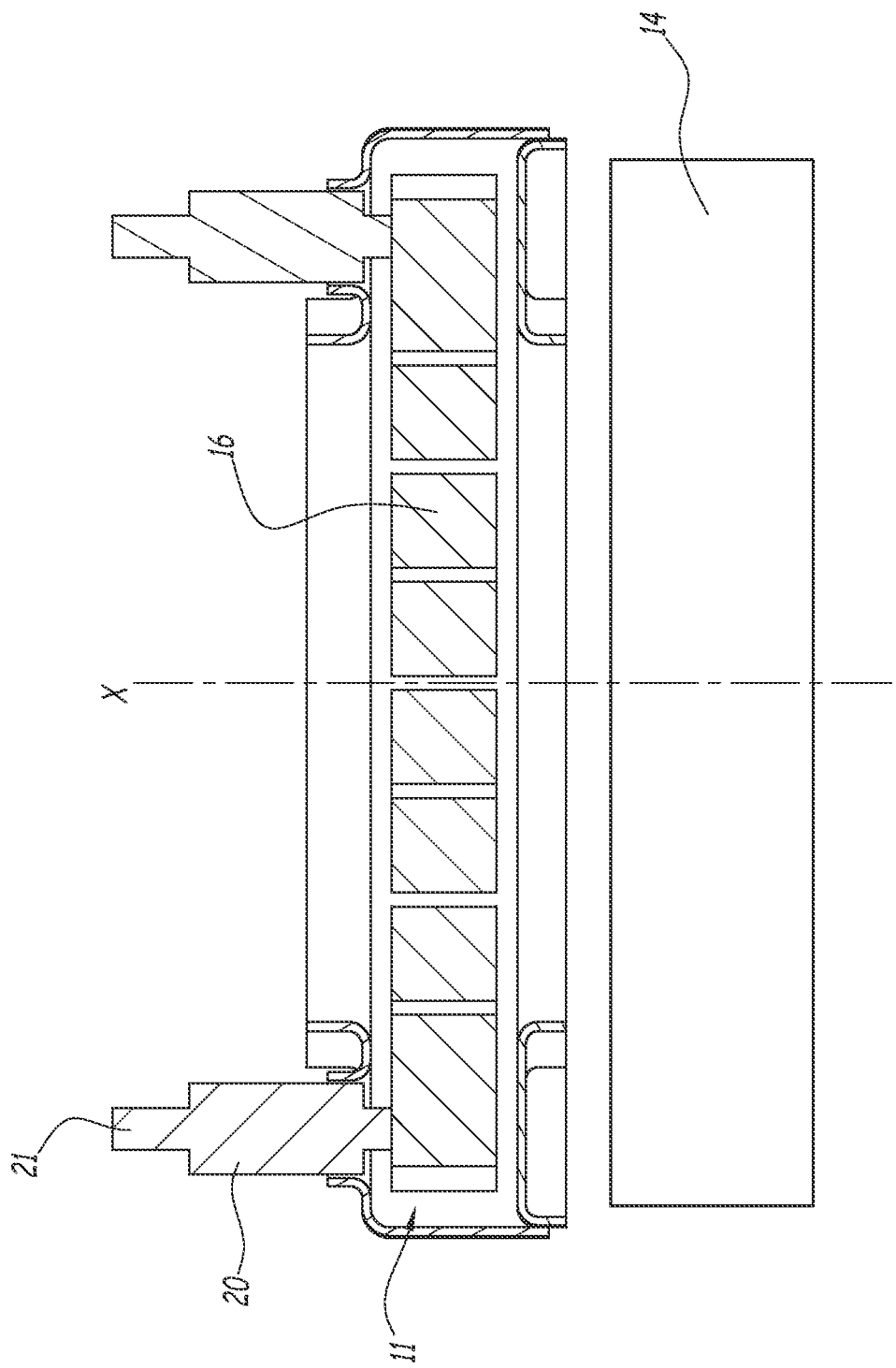
FIG. 2 is a partial axial cross-sectional view of the device of FIG. 1.
Figure 3:
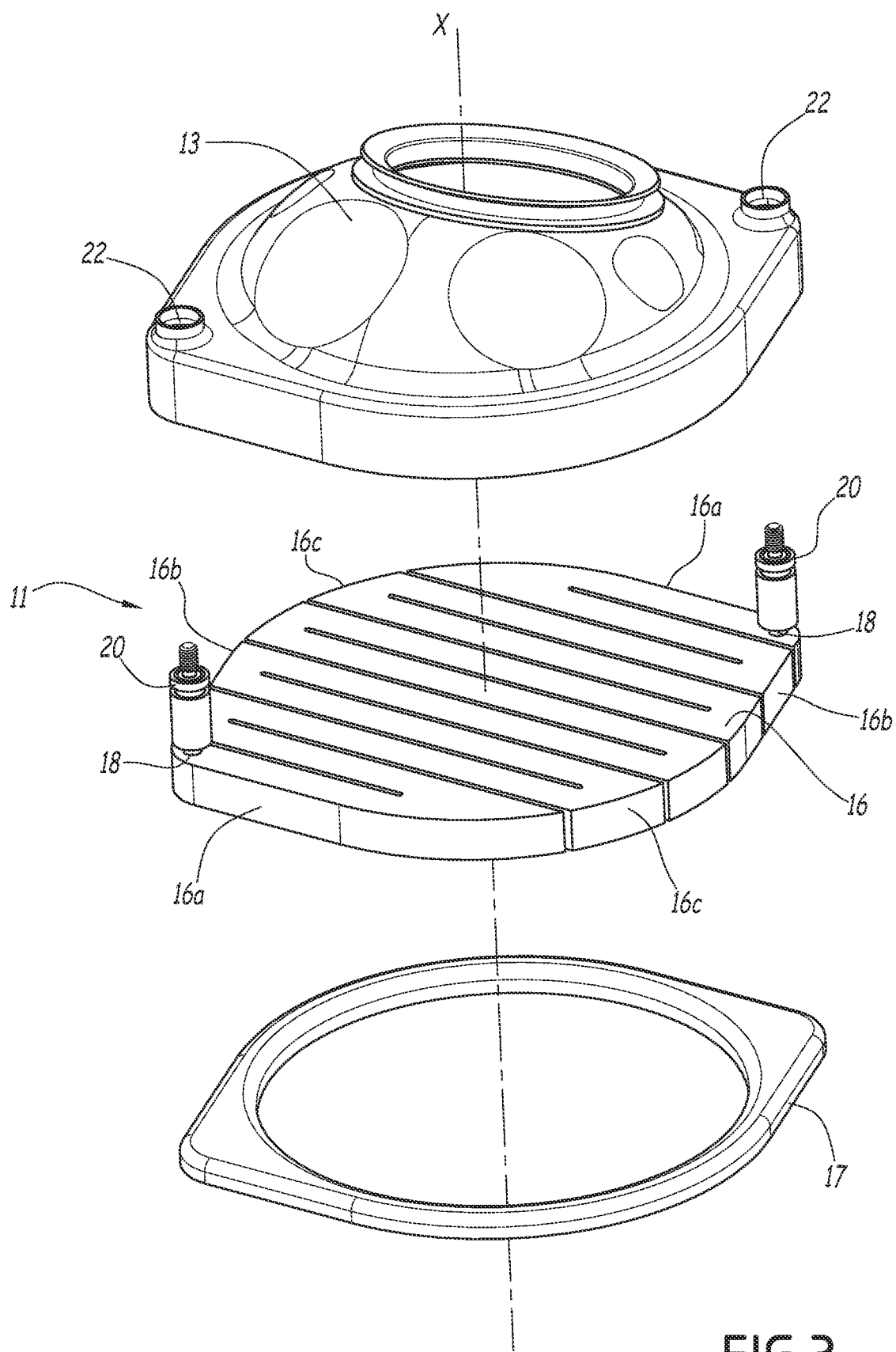
FIG. 3 is a partial exploded view of the device of FIG. 1.

A purification device 10 according to a first exemplary embodiment, intended to be fitted to an exhaust line of an internal combustion engine, is shown in FIGS. 1 to 3.

The purification device 10 is arranged in the exhaust line between an upstream section and a downstream section. The terms "upstream" and "downstream" are considered according to the direction of flow of the exhaust gases in the exhaust line.

The purification device 10 comprises a housing 12, extending in a longitudinal direction X, and defining a housing internal cavity. The housing 12 is made of a metallic material, for example.

The purification device 10 also comprises an inlet element 13, closing the housing on the upstream side. This inlet element 13 has a shape that widens from an inlet pipe of the upstream section to the housing 12. The inlet element 13 has a general truncated cone shape, for example, or any widening shape.

The purification device 10 includes a purification member 14, which is housed in the housing 12 so that the exhaust gases flowing through the housing 12 pass through this purification member 14. The purification member 14 is a conventional selective catalytic reduction member. The purification member 14 preferably has a general shape of revolution about an axis parallel to the longitudinal direction.

In a conventional manner, the purification device 10 includes a heating device 11, comprising a heating element 16, arranged in proximity to the purification member 14, preferably upstream of the purification member 14.

The heating element 16 is housed in the housing 12. The heating element 16 is intended to be traversed by the exhaust gases flowing in the longitudinal direction X. Advantageously, the heating element 16 has a generally revolving shape around an axis parallel to the longitudinal direction X.

Advantageously, the purification device 10 includes an element 17 for holding the heating element 16 in the housing 12. The heating element 16 is thus longitudinally interposed, in the described example, between the inlet element 13 and the holding element 17.

Preferably, the input element 13 is attached to the holding element 17, which is attached to the housing 12. Thus, the input element 13 is connected to the housing 12 via the holding element 17.

Advantageously, electrical insulators (not shown) are arranged between the heating element 16 and the input element 13, and/or between the heating element 16 and the holding element 17.

Advantageously, the input element 13 and/or the holding element 17 has larger radial dimensions than the housing 12. In other words, in at least one radial direction perpendicular to the longitudinal direction X, the inlet element 13 and/or the holding element 17 has a dimension greater than that of the housing 12 taken in the same direction.

The heating element 16 is permeable to the exhaust gases and intended to be traversed by the exhaust gases flowing in the longitudinal direction X, so that the exhaust gases are heated as they pass through the heating element 16.

Preferably, the heating element 16 is made of a metal foam. Alternatively, the heating element 16 may be formed by a metal grid.

The heating element 16 extends over the entire passage section of the housing 12, so that the exhaust gases flowing through the housing 12 necessarily pass through the heating element 16. The exhaust gases are thus heated uniformly.

The heating element 16 has two electrical poles 18, through which the heating element 16 is intended to be electrically powered. For this purpose, each of these electrical poles 18 is intended to be connected to a respective electrode.

Advantageously, the electrical poles 18 comprise reinforced areas of greater material densification than the rest of the heating element 16.

The electrical poles 18 are preferably arranged at the periphery of the heating element 16. For this purpose, a peripheral zone is defined, running along the edge of the heating element 16, an electrical pole 18 being considered to be on the periphery of the heating element 16 when the distance between this electrical pole 18 and the nearest edge of the heating element 16 is less than or equal to approximately 20 mm.

The heating element 16 has a boustrophedon shape, for example, i.e., a shape extending back and forth from one edge of the heating element to the other, analogous to an ox making the furrows in a field, or by analogy with a boustrophedon writing. The boustrophedon shape defines an electrical path for the electric current. In order to maximize this electrical path, the electrical poles 18 are arranged at the ends of the boustrophedon shape, as seen in FIG. 3.

In the example described, the heating element 16 has a general shape bounded by two first walls 16a parallel to each other on the one hand, two second walls 16b parallel to each other on the other hand, and two curved walls 16c each extending between a respective one of the first walls 16a and a respective one of the second walls 16b.

The boustrophedon shape is defined parallel to the first walls 16a, i.e. each round trip is parallel to the first walls 16a.

It should be noted that, in a variant, the heating element 16 could have any other conceivable shape. For example, the heating element 16 could have a conventional general shape, cylindrical with a circular base.

Figure 5:
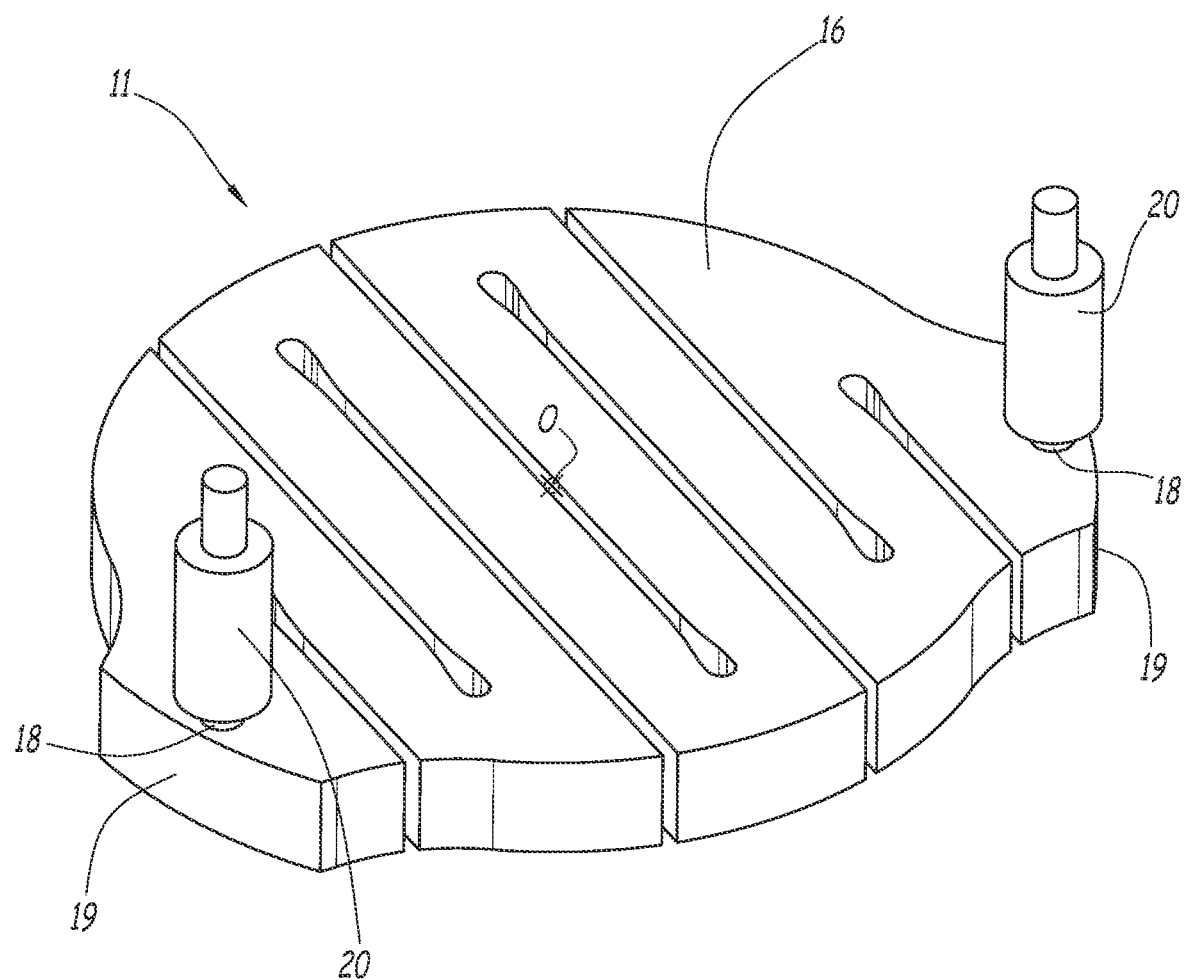
FIG. 5 is a perspective view of a heating device fitted to a purification device according to a third exemplary embodiment of the disclosure.

Another example is shown in FIG. 5. In this FIG. 5, the heating element 16 has a generally cylindrical shape with a circular base, including a radial extension 19 for each electrical pole 18.

This example in FIG. 5 further shows a different arrangement of electrical poles than in FIG. 3.

In FIG. 3, the electrical poles 18 are aligned with a center of symmetry of the heating element 16, which is not the case in FIG. 5. In FIG. 5, considering a center O of the heating element 16, this center being that of the circular portion of this heating element 16, and considering two lines each passing through a respective electric pole 18 and the center O, these lines form a non-zero angle between them, such as an angle equal to 90°. Any angle between these lines is possible (even a zero angle, which corresponds to the case of FIG. 3), this angle being chosen according to the desired location of the electric poles 18.

The heating device 11 comprises two electrodes 20, each intended to be connected to a respective electrical connector element. For this purpose, each electrode 20 has a threaded end 21, for example.

Each electrode 20 is attached to a respective one of the electrical poles 18.

Each electrode 20 typically has a generally elongated shape in an elongation direction. "Generally elongated shape in an elongation direction" means that the largest dimension of the electrode 20 is defined in the elongation direction.

According to the disclosure, at least one of the electrodes 20 is elongated parallel to the longitudinal direction X, i.e., its elongation direction is parallel to the longitudinal direction X.

Preferably, according to the described embodiment, at least one of the electrodes 20, is elongated substantially parallel to the longitudinal direction X.

Advantageously, both electrodes 20 are elongated substantially parallel to the longitudinal direction X, i.e. their elongation directions are substantially parallel to each other and substantially parallel to the longitudinal direction X.

"Substantially parallel" means an angular offset of plus or minus 20° with respect to the longitudinal direction X, and preferably plus or minus 10°.

According to the embodiment described with reference to FIGS. 1 to 3, the electrodes 20 extend from the heating element 16 toward the input element 13. For each electrode 20 extending parallel to the longitudinal direction X, the input element 13 then has an opening 22, for passage of the corresponding electrode 20. Each of these electrodes 20 is thus accessible from outside the housing, through the corresponding through-hole 22.

Advantageously, the purification device 10 comprises elements 23 for protecting the electrodes 20. Each protective element 23 is fixedly connected to the inlet element 13 and/or to the holding element 17, and extends parallel to the corresponding electrode 20. Preferably, each protective element 23 surrounds the corresponding electrode 20, at least partially.

Figure 4:
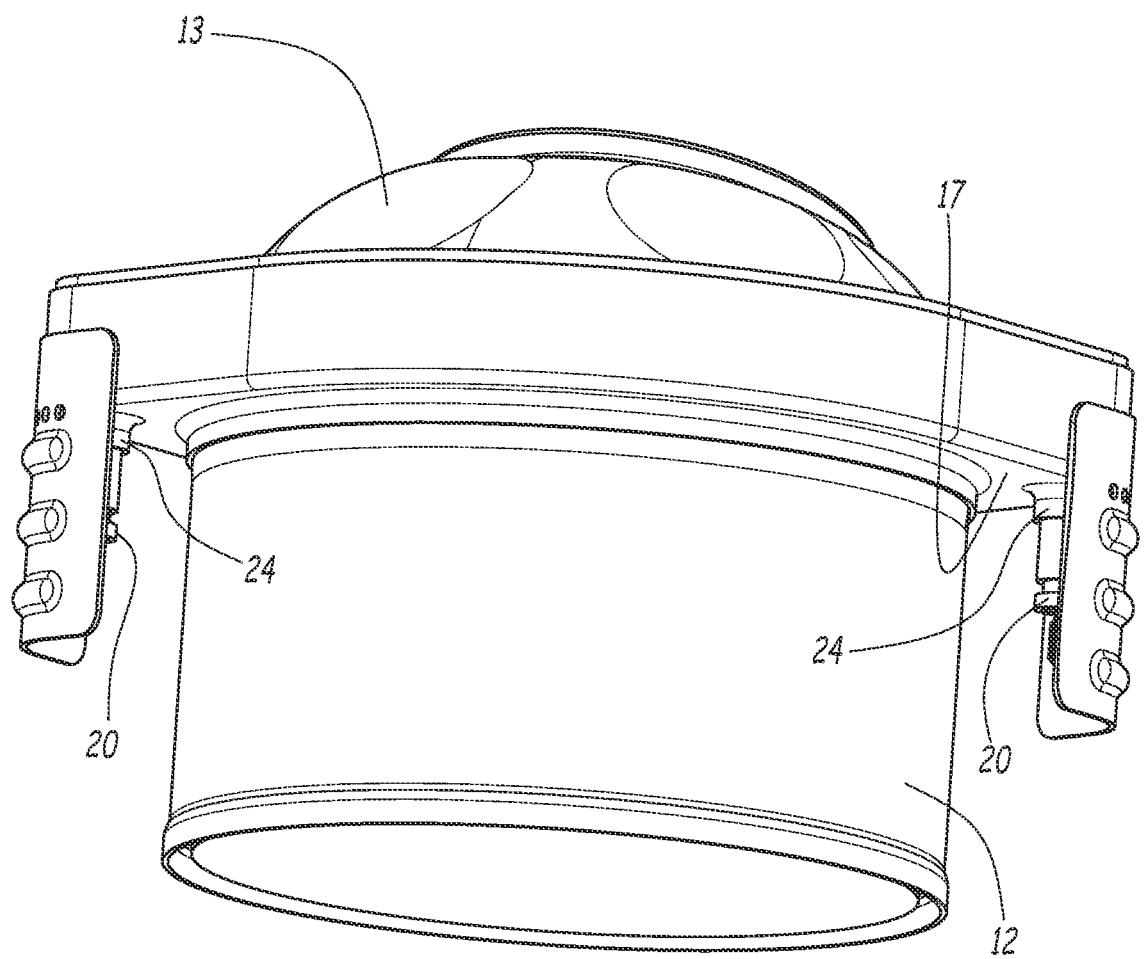
FIG. 4 is a perspective view of a purification device including a heater according to a second exemplary embodiment of the disclosure.

The purification device 10 according to a second embodiment of the disclosure has been shown in FIG. 4. In this figure, the elements similar to those of the first embodiment are designated by identical references.

According to this second embodiment, the electrodes 20 extend from the heating element 16 towards the holding element 17. For each electrode 20 extending parallel to the longitudinal direction X, the holding element 17 then includes a hole 24 for passage of the corresponding electrode 20. Each of these electrodes 20 is thus accessible from outside the housing, through the corresponding through-hole 24.

It should be noted that, since the holding element 17 has radial dimensions greater than those of the housing 12, the electrodes 20 extend outside the housing delimited by the housing 12.

It will be noted that the disclosure clearly allows the radial dimensions of the purification device 10 to be reduced.

It will also be noted that the disclosure is not limited to the previously described embodiments, but could have various variants without going beyond the scope of the claims.

For example, according to one embodiment not shown, one of the electrodes 20 extends from the heating element 16 toward the inlet element 13, and thus extends through a through-hole 22 in the inlet element 13, and the other electrode 20 extends from the heating element 16 toward the holding element 17, and thus extends through a through-hole 24 in the holding element 17.

According to another embodiment not shown, the direction of elongation of one of the electrodes 20 extends in a plane perpendicular to the longitudinal direction X, such direction of elongation being for example perpendicular to the longitudinal direction X. In this case, the other electrode 20 naturally extends parallel to the longitudinal direction X. This electrode 20 parallel to the longitudinal direction X may extend through the input element 13 or, in a variant, through the holding element 17.

Although various embodiments have been disclosed, a worker of ordinary skill in this art would recognize that certain modifications would come within the scope of this disclosure. For that reason, the following claims should be studied to determine the true scope and content of this disclosure.

The invention claimed is:

1. A heating device for an exhaust gas, comprising:
a heating element, permeable to the exhaust gas and intended to be traversed by the exhaust gas flowing in a longitudinal direction, the heating element comprising two electrical poles; and
two electrodes, each of the two electrodes attached to a respective one of the two electrical poles, each of the two electrodes having a generally elongated shape along a respective elongation direction,
wherein at least one of the two electrodes has an elongation direction parallel to the longitudinal direction; and
wherein the heating element has a general shape delimited by two first walls parallel to each other, two second walls parallel to each other, and two curved walls each extending between a respective one of the first walls and a respective one of the second walls.

2. The heating device according to claim 1, wherein both of the two electrodes have a direction of elongation parallel to the longitudinal direction.

3. The heating device according to claim 1, wherein the two electrodes are arranged at a periphery of the heating element.

4. The heating device according to claim 1, wherein the heating element is a metal foam.

5. The heating device according to claim 1, wherein the heating element is a metal grid.

6. An exhaust line of a combustion engine, comprising:
the heating device according to claim 1; and
an inlet member that connects the heating device with an upstream portion of the exhaust line.

7. The exhaust line according to claim 6, wherein, for at least one electrode having a direction of elongation parallel to the longitudinal direction, a respective protective element for the at least one electrode having a direction of elongation parallel to the longitudinal direction, the protective element being elongated parallel to the at least one electrode.

8. The exhaust line according to claim 7, wherein the respective protective element at least partially surrounds the at least one electrode.

9. The heating device according to claim 1, wherein the exhaust gas flows in the longitudinal direction along a longitudinal axis, and wherein the shape of the heating element comprises a cross-section having an outer peripheral surface that surrounds the longitudinal axis.

10. The heating device according to claim 9, wherein one of the two first walls transitions into one of the two second walls, which transitions into the one of the two curved walls, which transitions into the other of the two first walls, which transitions into the other of the two second walls, which transitions into the other of the two curved walls, which transitions back into the one of the first walls to form the outer peripheral surface that surrounds the longitudinal axis.

11. An exhaust line of a combustion engine comprising:
a heating device that comprises
a heating element, permeable to the exhaust gas and intended to be traversed by the exhaust gas flowing in a longitudinal direction, the heating element comprising two electrical poles;
two electrodes, each of the two electrodes attached to a respective one of the two electrical poles, each of the two electrodes having a generally elongated shape along a respective elongation direction,
wherein at least one of the two electrodes has an elongation direction parallel to the longitudinal direction; and
a holding element connected to the inlet member and connected to a housing extending in the longitudinal direction, the heating element being accommodated between the inlet member and the holding element.

12. The exhaust line according to claim 11, wherein the inlet member has at least one opening for passage of at least one of the two electrodes having a direction of elongation parallel to the longitudinal direction.

13. The exhaust line according to claim 11, wherein the holding element has at least one opening for passage of at least one of the two electrodes having a direction of elongation parallel to the longitudinal direction.

14. The exhaust line according to claim 11, wherein the inlet member and the holding element both have at least one respective opening for passage of at least one of the two electrodes having a direction of elongation parallel to the longitudinal direction.

15. A heating device for an exhaust gas, comprising:
a heating element, permeable to the exhaust gas and intended to be traversed by the exhaust gas flowing in a longitudinal direction, the heating element comprising two electrical poles; and
two electrodes, each of the two electrodes attached to a respective one of the two electrical poles, each of the two electrodes having a generally elongated shape along a respective elongation direction,
wherein at least one of the two electrodes has an elongation direction parallel to the longitudinal direction; and
wherein the heating element has a surface perpendicular to the gas flow, the electrical poles being held by this surface and the electrodes extending perpendicular to this surface.

* * * * *